United States Patent
Agarwal et al.

(10) Patent No.: US 11,556,774 B2
(45) Date of Patent: Jan. 17, 2023

(54) METHOD AND SYSTEM FOR FORECASTING IN SPARSE DATA STREAMS VIA DENSE DATA STREAMS

(71) Applicant: Conduent Business Services, LLC, Dallas, TX (US)

(72) Inventors: Sakshi Agarwal, West Bengal (IN); Poorvi Agarwal, Karnataka (IN); Arun Rajkumar, Tamil Nadu (IN); Sharanya Eswaran, Karnataka (IN)

(73) Assignee: Conduent Business Services, LLC, Florham Park, NJ (US)

( * ) Notice: Subject to any disclaimer, the term of this patent is extended or adjusted under 35 U.S.C. 154(b) by 1179 days.

(21) Appl. No.: 16/112,768

(22) Filed: Aug. 27, 2018

(65) Prior Publication Data
US 2020/0065667 A1 Feb. 27, 2020

(51) Int. Cl.
*G06N 3/08* (2006.01)
*G06F 16/28* (2019.01)
*G06Q 30/06* (2012.01)

(52) U.S. Cl.
CPC ............. *G06N 3/08* (2013.01); *G06F 16/285* (2019.01); *G06Q 30/0631* (2013.01)

(58) Field of Classification Search
CPC ..... G06N 3/08; G06F 16/285; G06Q 30/0631
See application file for complete search history.

(56) References Cited

U.S. PATENT DOCUMENTS

| | | | |
|---|---|---|---|
| 8,892,498 B2 | 11/2014 | Guanwardana et al. | |
| 9,129,219 B1 | 9/2015 | Robertson et al. | |
| 9,639,642 B2 | 5/2017 | Jetcheva et al. | |
| 10,002,034 B2 | 7/2018 | Li et al. | |
| 10,025,753 B2 | 7/2018 | Leonard et al. | |
| 2017/0249563 A1* | 8/2017 | Garvey | G06N 20/00 |
| 2019/0349273 A1* | 11/2019 | Rikovic Tabak | H04L 41/16 |
| 2020/0034266 A1* | 1/2020 | Kleiner | G06F 11/3034 |

OTHER PUBLICATIONS

Du et al., "Recurrent Marked Temporal Point Processes: Embedding Event History to Vector", Aug. 13, 2016, KDD '16: Proceedings of the 22nd ACM SIGKDD International Conference on Knowledge Discovery and Data Mining, pp. 1555-1564. (Year: 2016).*

(Continued)

*Primary Examiner* — Ying Yu Chen
(74) *Attorney, Agent, or Firm* — Ortiz & Lopez, PLLC; Kermit D. Lopez; Luis M. Ortiz

(57) ABSTRACT

Methods and systems for forecasting in sparse data streams. In an example embodiment, steps or operations can be implemented for mapping a time series data stream to generate forecast features using a neural network, transforming the forecast features into a space with transformed forecast features thereof using metric learning, clustering the transformed forecast features in a cluster, initializing a forecast learning algorithm with a combination of the transformed forecast features in the cluster corresponding to a sparse data stream, and displaying forecasts in a GUI dashboard with information indicative of how the forecasts were achieved, wherein the mapping, the transforming, the clustering, and the initializing together lead to increases in a speed of the forecasting and computer processing thereof.

18 Claims, 7 Drawing Sheets

(56) References Cited

OTHER PUBLICATIONS

Che et al., "DECADE: A Deep Metric Learning Model for Multivariate Time Series", Aug. 2017, MiLeTS17, pp. 1-9. (Year: 2017).*
Cheng et al., "Sparse Multi-Output Gaussian Processes for Medical Time Series Prediction", Jun. 21, 2018, arXiv:1703.09112v2, pp. 1-62. (Year: 2018).*
Rani et al., "Recent Techniques of Clustering of Time Series Data: A Survey", Aug. 2012, International Journal of Computer Applications (0975-8887), vol. 52—No. 15, pp. 1-9. (Year: 2012).*

\* cited by examiner

METHOD AND SYSTEM FOR FORECASTING IN SPARSE DATA STREAMS VIA DENSE DATA STREAMS

TECHNICAL FIELD

Embodiments are generally related to the field of time series analysis. Embodiments further relate to forecasting based on time series data contained in a time series data stream. Embodiments further relate to improvements in forecasting speed and efficiencies in computer processing and related computing operations.

BACKGROUND

Real world datasets often occur with timestamps (e.g., as a time series). Examples of datasets include crime data collected over a period time in various cities of a country, purchases of various products from an online or retail departmental store, and so on. One of the most useful learning problems associated with such datasets is the ability to forecast future crimes or future product purchases, etc. Such forecasts can directly lead to actionable insights for the crime department (e.g., 'employ more patrol vehicles in a particular area of the city') or a sales department of an online/retail store (e.g., 'stock more of product X before next week as there is an expected increase in purchases). Such actionable insights can directly affect cost, productivity or other key performance metrics. Hence, forecasting is an important problem particularly in the context of time series analysis.

Certain types of time series data streams may be sparse in nature. By sparse, we mean that the number of occurrence of an event of interest (e.g., crimes in a city or a purchase of a particular product X) is sparsely distributed over time. Such data streams might still exhibit patterns of interest even though the number of data points is small. For instance, certain crimes might only be committed during a particular time of the year (e.g., when there is more inflow into a tourist city for instance) or certain products might be bought only during certain time of the year (e.g., greeting cards for Christmas). When the number of data points available for forecasting is less, it is often a challenge for traditional time series based approaches to engage in accurate forecasting. In addition, conventional forecasting is slower, which slows down the processing time of, for example, processors utilized in a data-processing system. Because conventional forecasting with computing systems is slow, this leads to decreases in processing speed, slower computer memory management, and increased power consumption. Improving the speed of forecasting with computing systems can lead to improved efficiencies in processing time and processor speed, along with improved memory management and lower power consumption.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for defining 'forecast features' using weights learned in a neural network.

It is another aspect of the disclosed embodiments to provide for a method and system for transforming the forecast features using metric learning approaches to obtain features, which are close in the 'forecast' space.

It is still another aspect of the disclosed embodiments to provide for a weight initialization method and system for entities with sparse data streams that combines the weights from different clusters thereby resulting in a fast implementation processing that is faster than conventional approaches.

It is yet another aspect of the disclosed embodiments to provide for explainable forecast predictions for sparse data streams using formed clusters.

It is a further aspect of the disclosed embodiments to provide for improvements in computing operations such as computer processing, and memory and power management.

It is also an aspect of the disclosed embodiments to provide for a non-abstract improvement to a computer technology via a technical solution to the technical problem(s) identified in the background section of this disclosure.

The aforementioned aspects and other objectives and advantages can now be achieved as described herein. Methods and systems are disclosed for forecasting in sparse data streams via dense data streams. In an example embodiment, steps or operations can be implemented for mapping a time series data stream to generate forecast features using a neural network, transforming the forecast features into a space with transformed forecast features thereof using metric learning, clustering the transformed forecast features in a cluster, initializing a forecast learning algorithm with a combination of the transformed forecast features in the cluster corresponding to a sparse data stream, and displaying forecasts in a GUI dashboard with information indicative of how the forecasts were achieved, wherein the mapping, the transforming, the clustering, and the initializing together lead to increases in a speed of the forecasting and computer processing thereof. The term "sparse" in "sparse data streams" can be defined as the number of occurrences of an event of interest that is sparsely distributed over time.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
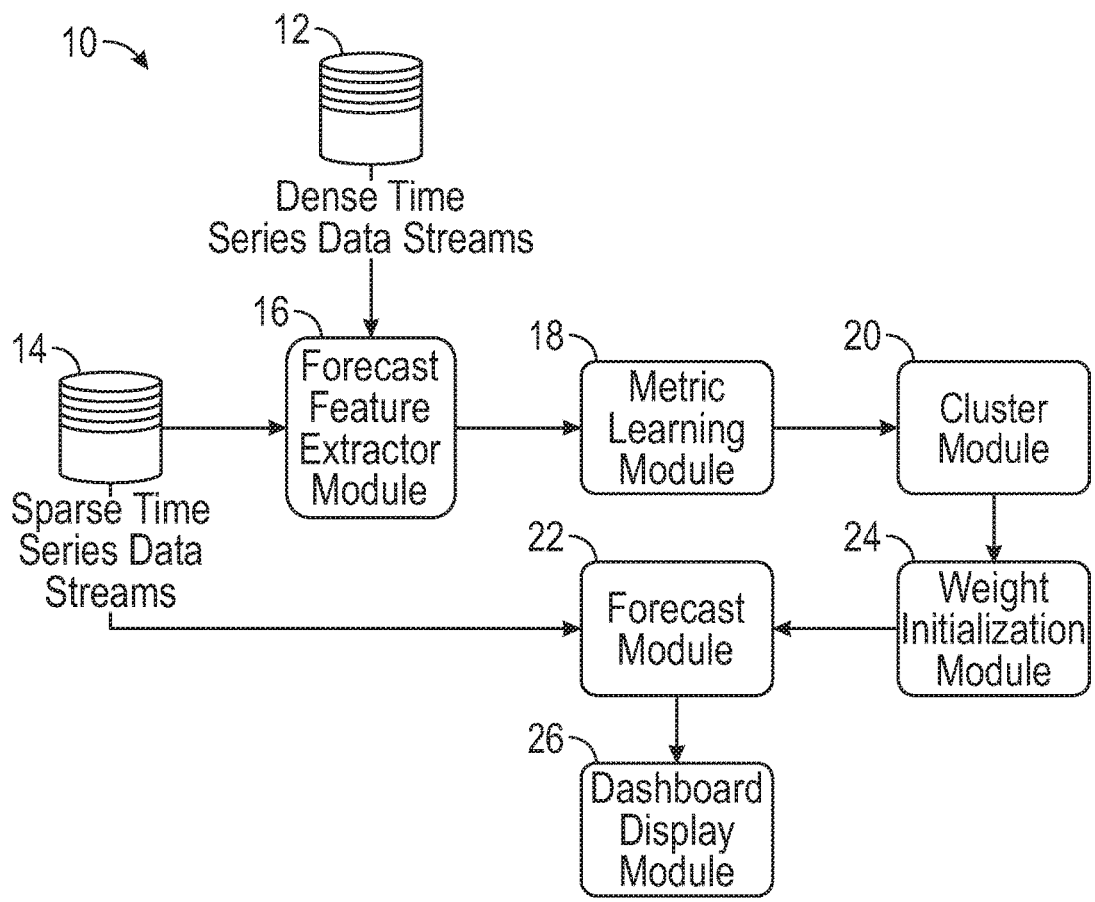
FIG. 1 illustrates a block diagram of a system for forecasting in sparse data streams via dense data streams, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The inventors have realized a non-abstract technical solution to the technical problem to improve a computer-technology (e.g., a performance of a processor and computing system) by improving the speed and accuracy of forecasting using computer-technology such as a processors and other related computing elements and components. That is, improvements in the time it takes to forecast via a processor means that the computing system employing the processor and related components (i.e., the "data-processing system") will experience improves in processing speed along with energy savings (i.e., due to a decrease in the amount of time it takes to process a forecasting operation). Thus, the disclosed embodiments offer technical improvements to a computer-technology such as a data-processing system.

The disclosed embodiments generally focus on certain types of time series data streams that are sparse in nature. By sparse, the inventors mean that the number of occurrence of an event of interest (e.g., crimes in a city or purchase of a particular product X) is sparsely distributed over time. Such data streams might still exhibit patterns of interest even though the number of data points is small. For instance, certain crimes might only be committed during a particular time of the year (e.g. when there is more inflow into a tourist city for instance) or certain products might be bought only during certain time of the year (e.g., greeting cards for Christmas for example). When the number of data points available for forecasting is less, it is often a challenge for traditional time series based approaches to accomplish accurate forecasting.

FIG. 1 illustrates a block diagram of a system 10 for forecasting in sparse data streams via dense data streams, in accordance with an example embodiment. The system 10 shown in FIG. 1 generally includes a group of modules including a forecast feature extractor module 16, a metric earning module 18, a cluster module 20, a forecast module 22, a weight initialization module 24, and a dashboard display module 26. As shown in FIG. 1, sparse time series data stream 14 can be provided as input to the forecast module 22 and to the forecast feature extractor module 16. A dense time series data stream 12 can also be provided as input to the forecast feature extractor module 16.

Note that the as utilized herein the term "dashboard" generally refers to a type of computer GUI (Graphical User Interface) that somewhat resembles an automobile's dashboard, and which organizes and presents information in a manner that is easy to read. A computer GUI dashboard, however, is more likely to be interactive than an automobile dashboard (unless it is also computer-based). To some extent, most GUIs resemble a dashboard. However, some product developers consciously employ this metaphor (and sometimes the term) so that the user instantly recognizes the similarity.

Some products that aim to integrate information from multiple components into a unified display refer to themselves as dashboards. For example, a product might obtain information from the local operating system in a computer, from one or more applications that may be running, and from one or more remote sites on the Web and present it as though it all came from the same source.

Output from the forecast feature extractor module 16 is provided as input to the machine learning module 18 which in turn provides data as output that is provided as input to the cluster module 20. Data output from the cluster module 20 is provided as input to the weight initialization module 24. In turn, data output from the weight initialization module 24 is fed as input to the forecast module 22 along with the sparse time series data stream 14 discussed above. Data output from the forecast module 22 is then provided as input to the dashboard display module 26.

The system 10 can forecast sparse time series data streams by making use of associated dense time series data streams. Applications include crime analytics, purchase pattern modeling among others. Regarding the forecast feature extraction module 16, the time series data streams of various entities (e.g., crimes in a city, purchases of a product etc.) are mapped to fixed length vectors referred to as 'forecast features' using a neural network based point process model. The novelty of the model lies in the usage of weights learned by the neural network as input features for the subsequent modules.

Regarding the metric learning module 16, the forecast features are (linearly) transformed into a space using a standard metric learning approach where the 'closer' forecast features correspond to, for example, cities which are 'closer' in terms of forecast accuracy. The cluster module 20 (also referred to as a clustering module) process an operation in which the transformed forecast features are clustered using a clustering algorithm such as, for example, a k-means algorithm (also referred to as "K-Means") or a spectral clustering algorithm. The cluster module 20 thus provides steps, instructions or operations for a clustering algorithm.

Note that the term clustering as utilized herein refers to a machine learning method or process involving a grouping of data points. Given a set of data points, a clustering algorithm such as provided by the cluster module 20 can be used to classify each data point into a specific group. In theory, data points that are in the same group should have similar properties and/or features, while data points in different groups should have highly dissimilar properties and/or features. Clustering is thus a technique, process or method of unsupervised learning, which can be applied in fields such as, for example, statistical data analysis and in many other fields. Examples of clustering techniques that can be provided via the data module 20 include, for example, K-Means Clustering, Mean-Shift Clustering, Spectral Clustering, Density-Based Spatial Clustering of Applications with Noise (DBSCAN), Expectation-Maximization (EM) Clustering using Gaussian Mixture Models (GMM), and Agglomerative Hierarchical Clustering, to name a few.

The weight initialization module 24 uses a combination of the (transformed) forecast features of the entities in the cluster corresponding to a sparse data stream entity as initialization for learning to forecast. The forecast module 22 and the dashboard display module 24 respectively compute the forecasts and displays the results obtained from the earlier modules. Additionally, the dashboard display module can also display cluster information and how the forecast was arrived at enabling detectability.

The system 10 can module sparse data streams via dense data streams by learning possibly implicit non-trivial non-linear correlations among the streams. System 10 makes use of neural network based point processes and combines these processes with metric learning based approaches to learn clusters of entities (e.g., cities, products etc.), which can then be used in a novel manner to forecast the sparse data streams. The algorithmic blocks are combined in a novel approach so that they re used for the problem at hand.

Unique features of the system 10 include a novel approach for defining 'forecast features' using weights learned in the neural network, along with a unique approach for transforming the forecast features using metric learning approaches to obtain features which are close in the 'forecast' space. A novel weight initialization scheme is also provided by system 10 for entities with sparse data streams that combines the weights from different clusters, which is very fast to implement. In addition, system 10 provides for explainable forecast predictions for sparse data streams using clusters formed.

System 10 thus can forecast sparse data streams via dense data streams. System 10 includes two input data sources 14 and 12 respectively corresponding to the sparse time series data stream and the other to the dense time series data stream. The details of the various modules shown in FIG. 1 are described in greater detail below along with the associated algorithms.

Figure 2:
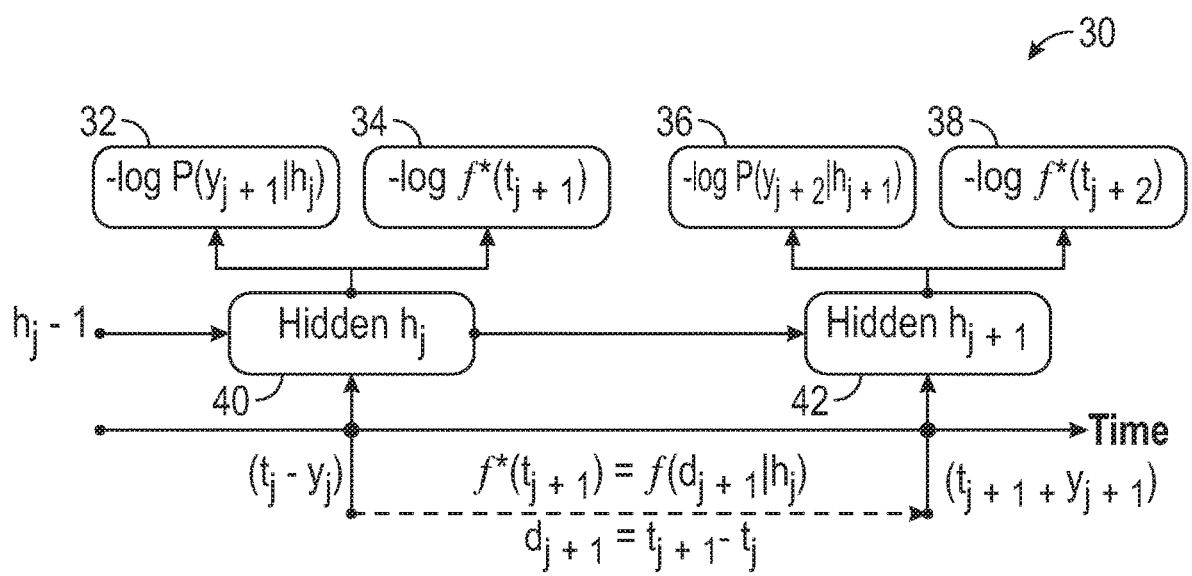
FIG. 2 illustrates a schematic diagram depicting RMTPP (Recurrent Marked Temporal Point Processes), in accordance with an example embodiment.

FIG. 2 illustrates a schematic diagram depicting RMTPP (Recurrent Marked Temporal Point Process) 30, in accordance with an example embodiment. For a forecasting task, we must extract relevant features from the time-series. The process shown in FIG. 2 is a type of recurrent neural network. Because RMTPP (Recurrent Marked Temporal Point Process) 30 is used in system 10 for time-series forecasting, we can focus on the model for some 'forecast features'. Note the term "Recurrent Marked Temporal Point Process" and "Recurrent Marked Temporal Point Processes" can be utilized interchangeably to refer to the same RMTPP feature. The RMTPP 30 shown in FIG. 2 includes blocks 32, 34, 36 and 38 and blocks 40 and 42. RMTPP 30 constitutes an RMTPP model and can be implemented in the context of a module such as the feature forecast extractor module 16 shown in FIG. 1.

As shown in FIG. 2, for the event occurring at the time $t_j$ of type $y_j$, the pair $(t_j; y_j)$ is fed as the input into a recurrent neural network unfolded up to the j+1-th event. The hidden unit embedding hj−1 represents the memory of the influence from the timings and the markers of past events. The neural network updates $h_{j-1}$ to $h_j$ by taking into account the effect of the current event $(t_j; y_j)$. Since now $h_j$ represents the influence of the history up to the j-th event, we can consider this as the most important feature for forecast capability and call it the 'forecast feature'. The forecast feature is essentially the hidden unit representation at the last time step, which in the inventors' experiments captures the crime pattern of a particular city till date. This module can therefore capture this forecast feature for each city, for example, separately for later use in clustering of all the cities via the aforementioned clustering module 20. This set of features can be extracted, for example, for all the cities present.

Once the forecast features are extracted via the forecast feature extractor module 16, the extracted data can be transformed in a space where similar feature sets get 'closer'. Thus, the metric learning module 18 focuses on transforming a set of points, respecting the constraint that those 'similar' to each other are brought closer. Considering the distance metric as:

$$D(x,y)=D_A(x,Y)=\|x-y\|_A=((x-y)^T A(x-y))^{1/2}$$

It is ensured that this be a metric—satisfying non-negativity and the triangle inequality—it is required that A be positive semi-definite A>=0.5; Setting A=1 gives Euclidean distance. If we restrict 5 to be diagonal, this corresponds to learning a metric in which the different axes are given different "weights"; more generally, A parameterizes a family of Mahalanobis distances over Rn. Learning such a distance metric is also equivalent to finding a rescaling of a data that replaces each point x with $A^{1/2}x$ and applying the standard Euclidean metric to the rescaled data. Solving the constraints involves a convex optimization problem, which is solved by efficient, local-minima-free algorithms.

Learning the distance metric and transforming the forecast features is a key to this module. A set of points can be assumed to be similar and dissimilar based on the forecasting ability. Two cities, for example, are said to be similar with respect to their crime patterns if the model of the second city can predict one city's crime time and event accurately. Similarly, two cities are said to be dissimilar in crime patterns if the prediction is inaccurate. Hence, taking some 1000 random pairs for each category, we feed the similarity and dissimilarity matrices to the metric learning module 18, which learns the distance metric according to the prediction accuracies.

After the transformation of the forecast features, we need to group the similar feature points together so that a similarity relationship between the crime cities is obtained. Hence, K-means can be used in some embodiments with the clustering module 20 to cluster the cities, for example, based on the forecast features extracted from RMTPP and we notice a difference in clusters when the transformed forecast features is used. Clusters based on these feature sets signify that the cities in one cluster have a similar crime pattern. System 10 focuses on capturing this relationship so that the sparsely distributed time series data can be related to densely distributed time series. The difference in the results is shown below in the experimentation section.

The weight initialization module 24 is a further key to system 10, wherein the relationship between the sparse and the dense time series data established via the clustering module 20 is finally used. The densely distributed time series similar to the sparse ones based on their prediction patterns are taken from the clusters obtained above and their RMTPP model weights are extracted. These weights are essentially the weights and biases learned in the embedding, hidden and output layer of a RMTPP model capable of predicting the time and event of crime. These weights from the model depict the crime patterns of a city, for example, and since these cities are similar to some 'low crime' cities, we can predict these low crime cities based on these weights. Such weights are averaged and initialized to the RMTPP model of the sparse crime data. This is how our module uses the knowledge learned from densely distributed time series to a sparse time series.

Figure 3:
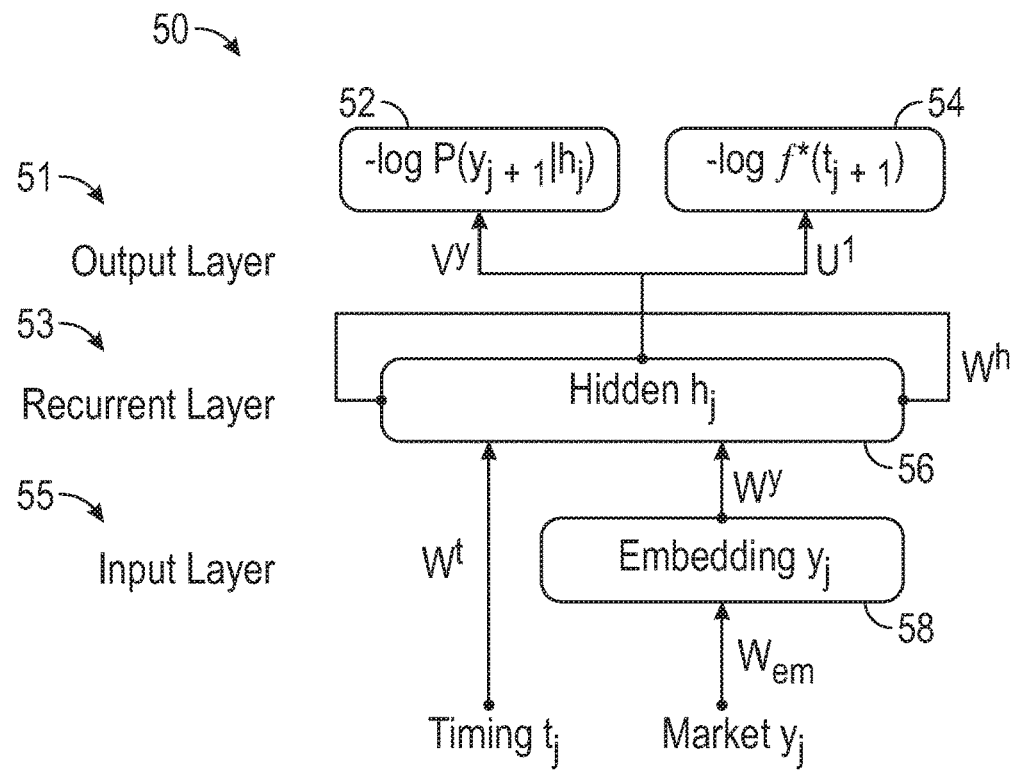
FIG. 3 illustrates a schematic diagram depicting exemplary architecture of RMTPP, in accordance with an example embodiment.

Now that the relationships have been captured, we can focus on forecasting. The forecast module 22 is a Recurrent Marked Temporal Point Process model, which consists of three layers: an input layer, a hidden layer and an output layer. FIG. 3 illustrates a schematic diagram depicting exemplary RMTPP architecture 50, in accordance with an example embodiment. FIG. 3 demonstrates the architecture of RMTPP and is composed generally of an input layer 55, a recurrent layer 53 and an output layer 51. Blocks 52 and 54 are contained within the output layer 51. A hidden layer 56 is contained within the recurrent layer 53, and an embedding block along with timing and marker inputs constitute the input layer 55.

For a given sequence $S=((t_j, y_j)_j=1^n)$, at the j-th event, the marker yj is first embedded into a latent space. Then, the embedded vector and the temporal features $(t_j-t_{j-1})$ are fed into the recurrent layer. The recurrent layer learns a representation that summaries the nonlinear dependency over the previous events. Based on the learned representation $h_j$, it outputs the prediction for the next marker $\hat{y}_{j+1}$ and timing $\hat{t}_{j+1}$ to calculate the respective loss functions.

Given the learned representation $h_j$, RMTPP models the marker generation with a multinomial distribution by:

$$P(y_{j+1}=k|h_j)=\exp(V_k^y h_j+b_k)/\Sigma_{k=1}^K \exp(V_k^y h_j+b_k)$$

The estimated time for the next event is the expectation $$t_{j+1}=\int_{t_j}^{\infty} *f(t)dt$$

Where, $$f(t)=\pi(t)*\exp(-\int_{t_j}^{t}\pi(t)dt), \qquad \text{(conditional density function)}$$

$$\pi(t)=\exp(v^{tT}\cdot h_j+w^t(t-t_j)+b^t), \qquad \text{(conditional intensity function)}$$

The disclosed approach has been evaluated experimentally on large-scale crime data of 141 cities in the United States. The inventors compared the disclosed approach with a simple RMTPP demonstrating that the system 10 performs better for sparsely distributed time series data. For example, 10 cities out of 141 cities suffer the problem of sparse distribution. Cities with crimes as low as 10 for 5 years were also observed. The error in prediction of crimes using RMTPP for these cities is given in Table 1. The columns for all the three tables below are the different L2 parameters for regularization. Table 2 shows the error of our system with the weights initialized for sparse data crime series prediction. Table 3 on the other hand, shows the error of our prediction system when metric learning is used on forecast features along with weights initialization. The charts depicted in FIGS. 4-8 demonstrate the comparison between all the algorithmic approaches mentioned for a particular L2 value for a city.

TABLE 1

Simple RMTPP Prediction Error

| Regularization parameters | 0 | 0.01 | 0.001 | 0.0001 | 0.1 |
| --- | --- | --- | --- | --- | --- |
| DUBUQUE | 0.019274 | 0.018331 | 0.023049 | 0.019063 | 0.018376 |
| GRAND FORKS | 0.027186 | 0.031842 | 0.031696 | 0.027343 | 0.039014 |
| MARION | 0.005252 | 0.007947 | 0.00508 | 0.005106 | 0.011255 |
| 'MOSES LAKE' | 0.011285 | 0.008993 | 0.010224 | 0.010219 | 0.012806 |
| 'MOUNT VERNON' | 0.014611 | 0.016353 | 0.016952 | 0.014771 | 0.014727 |
| OLYMPIA | 0.030224 | 0.031357 | 0.031196 | 0.032295 | 0.030821 |
| 'RICHMOND | 0.030224 | 0.007216 | 0.006915 | 0.007229 | 0.009117 |
| SANDUSKY | 0.030224 | 0.023571 | 0.023677 | 0.023598 | 0.02371 |
| STILLWATER | 0.030224 | 0.023034 | 0.022281 | 0.023638 | 0.022609 |
| 'WALLA WALLA' | 0.030224 | 0.038158 | 0.03978 | 0.035028 | 0.038971 |

TABLE 2

Prediction with Weights Initialized in System

| Regularization parameters | 0 | 0.01 | 0.001 | 0.0001 | 0.1 |
| --- | --- | --- | --- | --- | --- |
| DUBUQUE | 0.019987 | 0.018177 | 0.017219 | 0.018636 | |
| GRAND FORKS | 0.030535 | 0.020515 | 0.033441 | 0.029107 | 0.018205 |
| MARION | | 0.005088 | 0.005082 | 0.007523 | 0.010655 |
| 'MOSES LAKE' | 0.010105 | 0.008063 | 0.009882 | 0.011441 | 0.010806 |
| 'MOUNT VERNON' | 0.014935 | 0.014556 | 0.014775 | 0.014957 | 0.014235 |
| OLYMPIA | 0.030727 | | 0.031262 | 0.031983 | 0.031337 |
| 'RICHMOND | 0.006776 | 0.006941 | 0.006772 | | 0.009026 |
| SANDUSKY | 0.023332 | 0.022678 | 0.021901 | | 0.021431 |
| STILLWATER | 0.023104 | 0.023033 | 0.022734 | | 0.023113 |
| 'WALLA WALLA' | 0.040305 | 0.040809 | 0.035921 | 0.03787 | 0.039963 |

TABLE 3

Prediction with Metric Learning and Weights Initialized

| Regularization parameters | 0 | 0.01 | 0.001 | 0.0001 | 0.1 |
| --- | --- | --- | --- | --- | --- |
| DUBUQUE | 0.019065 | 0.018248 | 0.014779 | 0.013372 | 0.019815 |
| GRAND FORKS | 0.028695 | 0.028591 | | 0.03389 | 0.025954 |
| MARION | 0.007316 | 0.007585 | 0.006041 | | 0.011068 |
| 'MOSES LAKE' | | 0.009217 | 0.011308 | 0.010016 | 0.011896 |
| 'MOUNT VERNON' | 0.015085 | | 0.014958 | 0.016317 | 0.013969 |
| OLYMPIA | 0.031114 | 0.030212 | 0.032006 | | 0.030323 |
| 'RICHMOND | | 0.00693 | 0.006805 | 0.006837 | 0.009294 |
| SANDUSKY | 0.022892 | 0.02305 | 0.021455 | 0.023065 | 0.0223 |
| STILLWATER | 0.022736 | | 0.022692 | 0.022329 | 0.022488 |
| 'WALLA WALLA' | 0.039979 | 0.040893 | 0.034763 | | 0.038968 |

Figure 4:
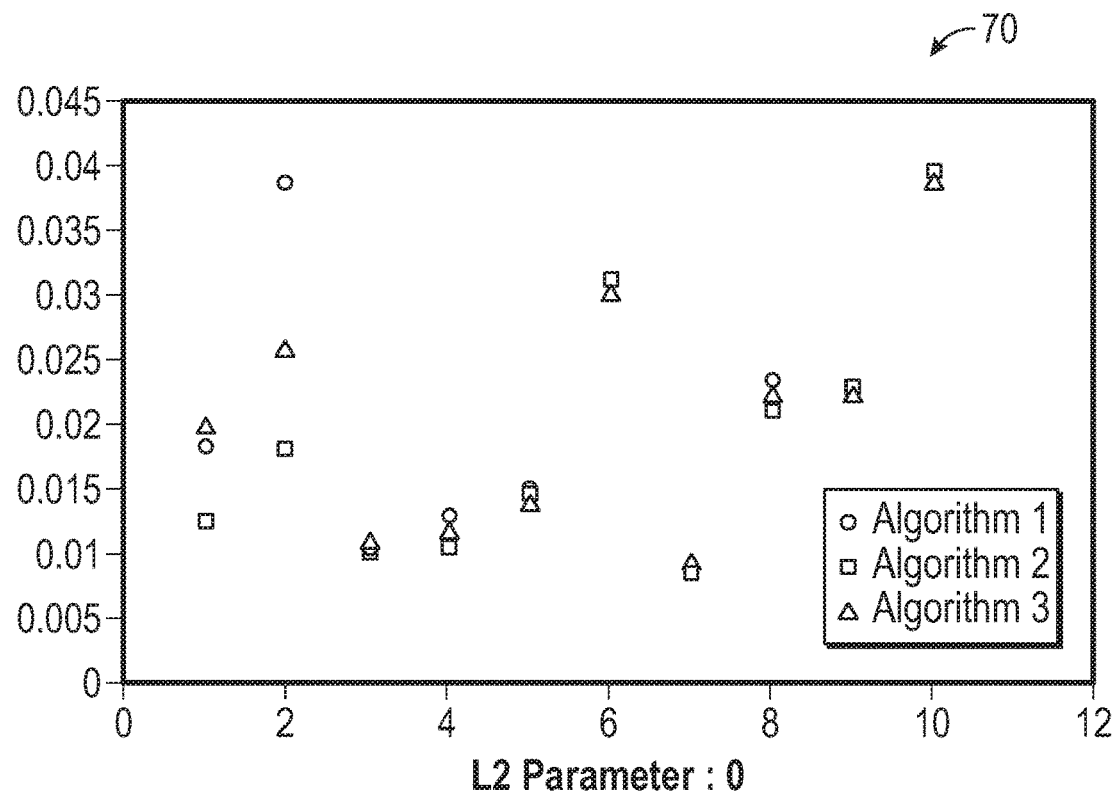
FIG. 4 illustrates a chart depicting a comparison between algorithms for a particular L2 parameter (e.g., 0), in accordance with an example embodiment.
Figure 5:
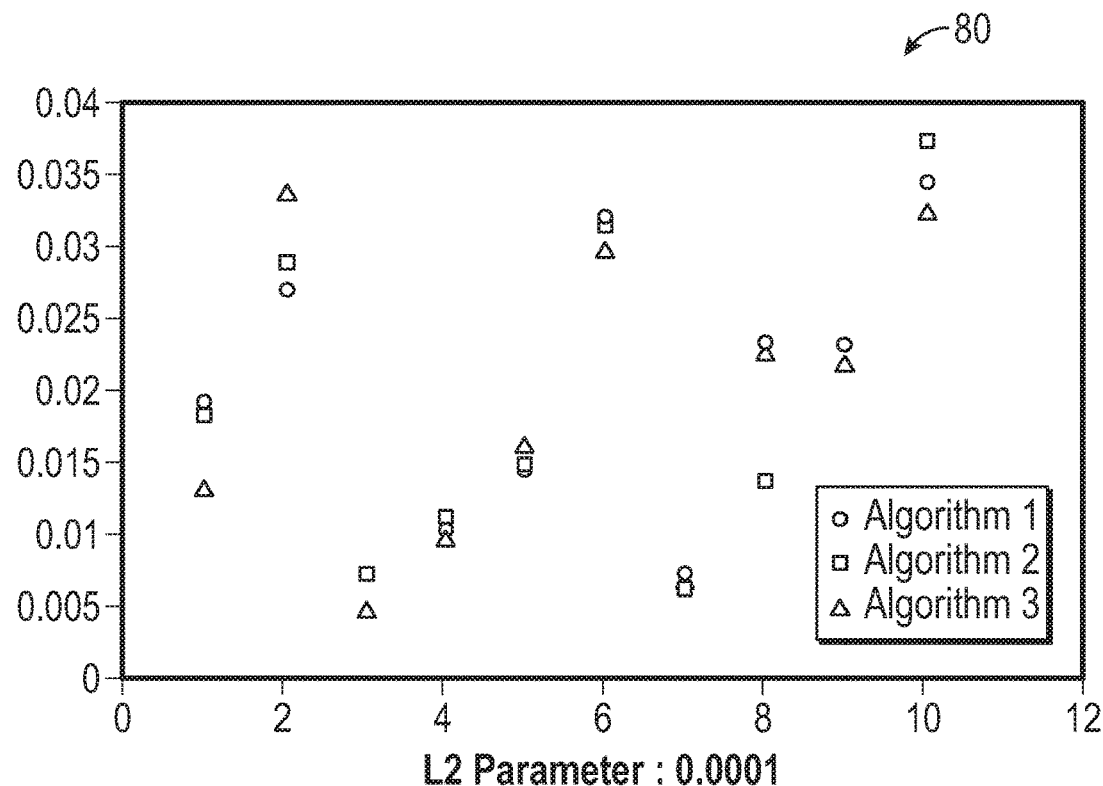
FIG. 5 illustrates a chart depicting a comparison between algorithms for a particular L2 parameter (e.g., 0.0001), in accordance with an example embodiment.
Figure 6:
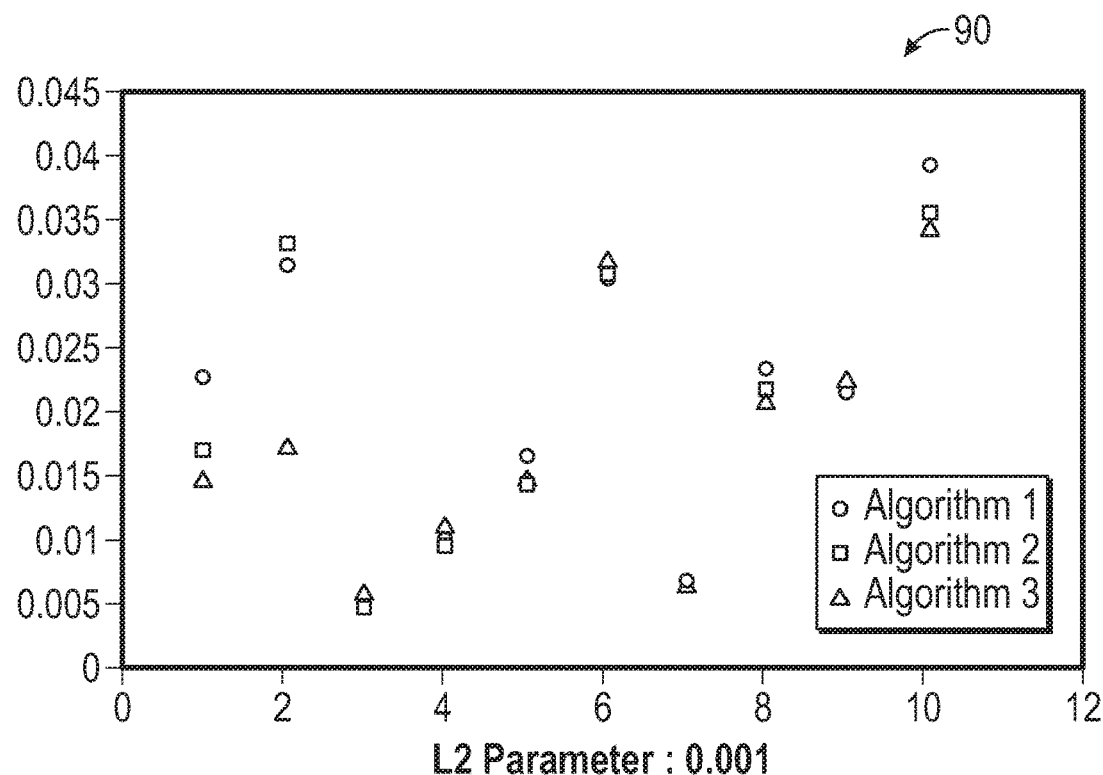
FIG. 6 illustrates a chart depicting a comparison between algorithms for a particular L2 parameter (e.g., 0.001), in accordance with an example embodiment.
Figure 7:
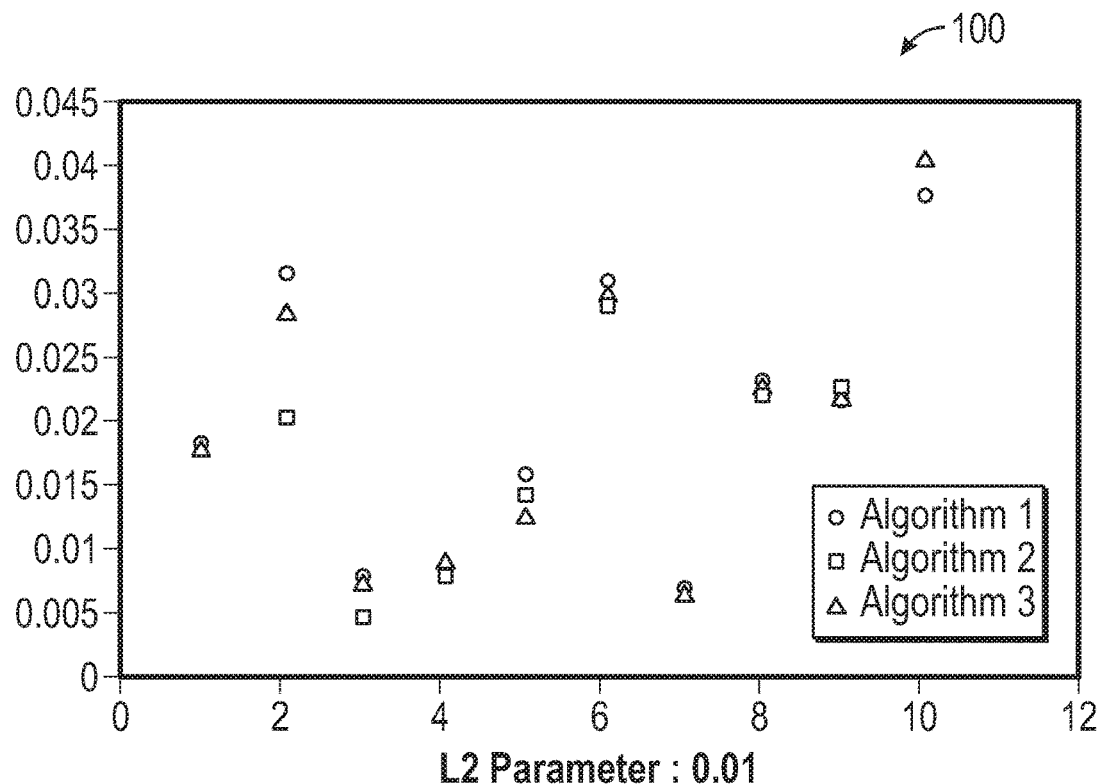
FIG. 7 illustrates a chart depicting a comparison between algorithms for a particular L2 parameter (e.g., 0.01), in accordance with an example embodiment.
Figure 8:
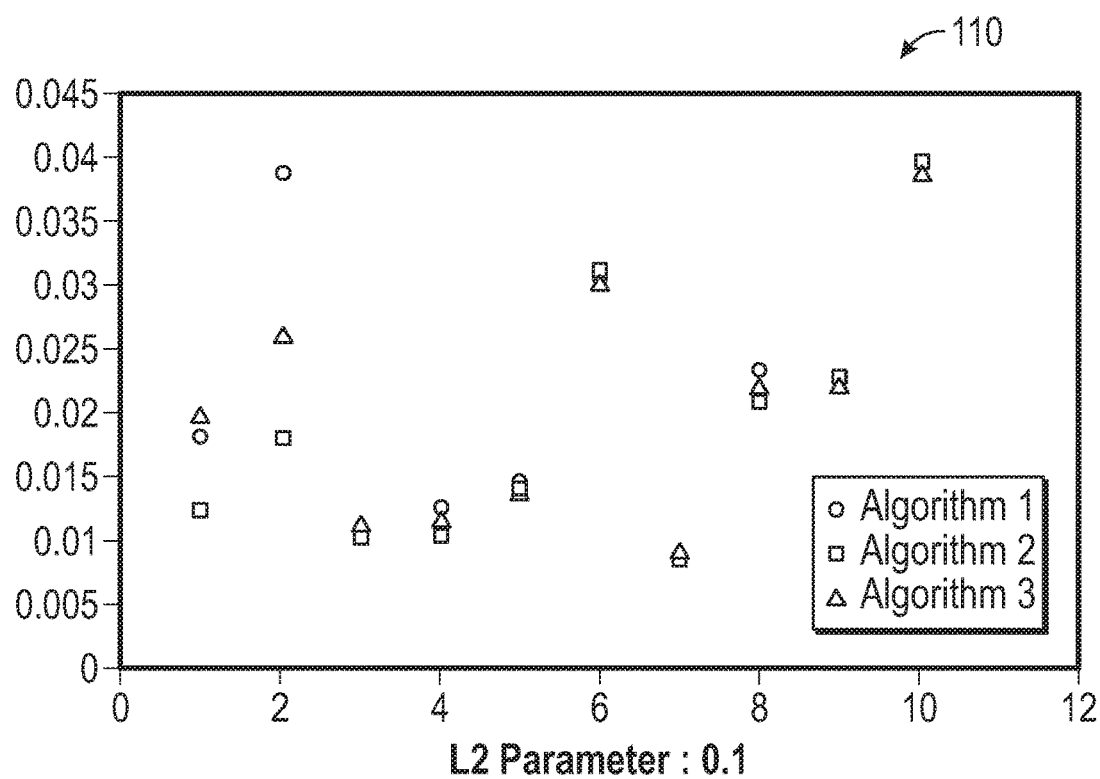
FIG. 8 illustrates a chart depicting a comparison between algorithms for a particular L2 parameter (e.g., 0.1), in accordance with an example embodiment.

FIG. 4 illustrates a chart depicting a comparison between algorithms for a particular L2 parameter (e.g., 0), in accordance with an example embodiment. FIG. 5 illustrates a chart depicting a comparison between algorithms for a particular L2 parameter (e.g., 0.0001), in accordance with another example embodiment. FIG. 6 illustrates a chart depicting a comparison between algorithms for a particular L2 parameter (e.g., 0.001), in accordance with another example embodiment. FIG. 7 illustrates a chart depicting a comparison between algorithms for a particular L2 parameter (e.g., 0.01), in accordance with another example embodiment. FIG. 8 illustrates a chart depicting a comparison between algorithms for a particular L2 parameter (e.g., 0.1), in accordance with another example embodiment.

Another example of an experimental dataset (see Tables 4, 5 and 6 below) contains all transactions occurring between Jan. 12, 2010 and Sep. 12, 2011 for a UK-based and registered non-store online retail. The same analysis as for the crime dataset has been done with the products and predicting the next purchase of a product is our primary concern. Similar to the above tables for crime, the three Tables 4, 5 and 6 and shown below, which show the error in prediction of crimes using RMTPP, setting the weights and applying metric learning.

TABLE 4

Simple RMTPP Prediction Error

| Regularization parameters | 0 | 0.01 | 0.001 | 0.0001 | 0.1 |
|---|---|---|---|---|---|
| 4 PURPLE FLOCK DINNER CANDLES | 0.04822 | 0.043324 | 0.048256 | 0.048274 | 0.049651 |
| 50'S CHRISTMAS GIFT BAG LARGE | 0.014484 | | 0.014496 | 0.014424 | 0.015139 |
| DOLLY GIRL BEAKER | 0.008239 | 0.008787 | 0.008335 | 0.008863 | 0.008154 |
| I LOVE LONDON MINI BACKPACK | 0.025133 | 0.025053 | 0.025108 | 0.025048 | 0.024978 |
| NINE DRAWER OFFICE TIDY | 0.059203 | 0.059399 | 0.059459 | 0.059536 | 0.059317 |
| OVAL WALL MIRROR DIAMANTE | 0.004419 | 0.005177 | 0.004994 | 0.004416 | 0.00488 |
| RED SPOT GIFT BAG LARGE | 0.012814 | 0.013018 | 0.013104 | 0.01292 | 0.012754 |
| TRELLIS COAT RACK | 0.024799 | 0.024948 | 0.02519 | 0.025211 | 0.024924 |
| 10 COLOUR SPACEBOY PEN | 0.003112 | 0.003112 | 0.003111 | 0.003112 | 0.003447 |

TABLE 5

Prediction with Weights Initialized in System

| Regularization parameters | 0 | 0.01 | 0.001 | 0.0001 | 0.1 |
|---|---|---|---|---|---|
| 4 PURPLE FLOCK DINNER CANDLES | 0.0481 | 0.048236 | 0.048021 | 0.047989 | 0.049651 |
| 50'S CHRISTMAS GIFT BAG LARGE | 0.01467 | 0.014757 | 0.014268 | 0.014809 | 0.014386 |
| DOLLY GIRL BEAKER | 0.008156 | 0.009239 | 0.00789 | 0.007262 | 0.007546 |
| I LOVE LONDON MINI BACKPACK | 0.025086 | | 0.025008 | 0.025065 | 0.025099 |
| NINE DRAWER OFFICE TIDY | 0.059466 | 0.059474 | 0.059362 | 0.05934 | 0.059315 |
| OVAL WALL MIRROR DIAMANTE | 0.005084 | | 0.005172 | 0.004997 | 0.004959 |
| RED SPOT GIFT BAG LARGE | 0.013341 | 0.012779 | | 0.012889 | 0.012824 |
| TRELLIS COAT RACK | | 0.024824 | 0.024861 | 0.024752 | 0.025012 |
| 10 COLOUR SPACEBOY PEN | | 0.003111 | 0.003111 | 0.003111 | 0.003476 |

TABLE 6

Prediction with Metric Learning and Weights Initialized

| Regularization parameters | 0 | 0.01 | 0.001 | 0.0001 | 0.1 |
|---|---|---|---|---|---|
| 4 PURPLE FLOCK DINNER CANDLES | | 0.048171 | 0.048034 | 0.048002 | 0.049654 |
| 50'S CHRISTMAS GIFT BAG LARGE | 0.014262 | 0.014134 | 0.014173 | 0.014319 | 0.014493 |
| DOLLY GIRL BEAKER | 0.007606 | 0.008358 | | 0.008299 | 0.00803 |
| I LOVE LONDON MINI BACKPACK | 0.024962 | 0.025123 | 0.025 | 0.025121 | 0.024985 |
| NINE DRAWER OFFICE TIDY | 0.059517 | 0.059326 | 0.059328 | | 0.059551 |
| OVAL WALL MIRROR DIAMANTE | 0.005051 | 0.004384 | 0.00508 | 0.004992 | 0.005527 |
| RED SPOT GIFT BAG LARGE | 0.012834 | 0.012985 | 0.013011 | 0.013057 | 0.012605 |
| TRELLIS COAT RACK | 0.025348 | 0.025019 | 0.024792 | 0.02501 | 0.024738 |
| 10 COLOUR SPACEBOY PEN | 0.003101 | 0.003112 | 0.003112 | 0.003113 | 0.00334 |

The disclosed embodiments thus offer a solution that overcomes the above problem with improvements to the underlying computer technology as well. To accomplish this, a method and system can be implemented that models the sparse data streams via dense data streams by learning possibly implicit non-trivial non-linear correlations among the streams. The disclosed embodiments use features such as neural network based point processes and combines them with metric learning based approaches to learn clusters of entities (e.g., cities, products etc.) which can then be used in a novel and unconventional manner to forecast the sparse data streams. System modules can be combined in a novel and unconventional matter so that they are used for the problem at hand.

Figure 9:
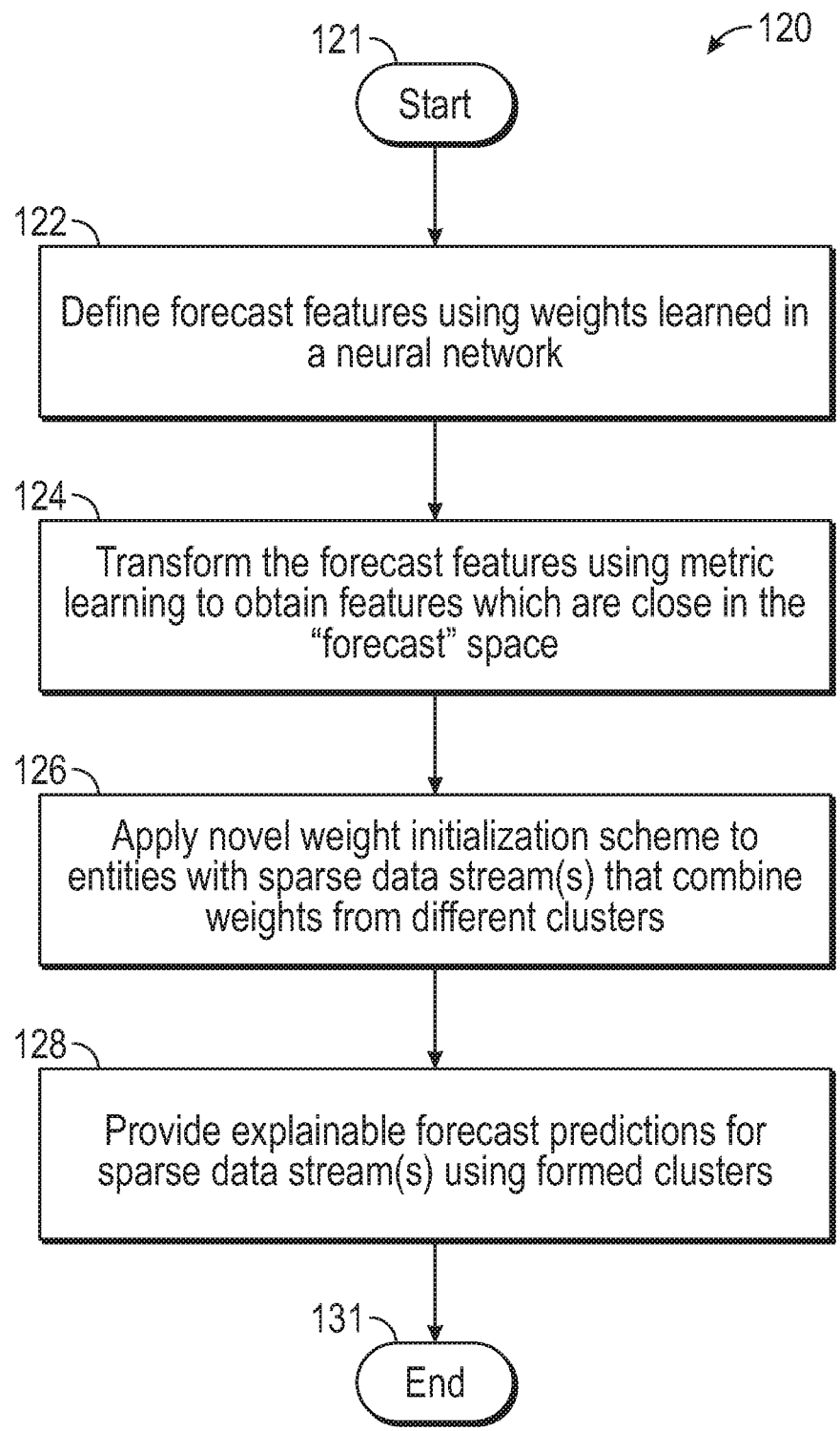
FIG. 9 illustrates a flow chart of operations illustrating logical operations, steps or instructions of a method for forecasting in sparse data streams via dense data streams, in accordance with an example embodiment.

FIG. 9 illustrates a flow chart of operations illustrating logical operations, steps or instructions of a method 120 for forecasting in sparse data streams via dense data streams, in accordance with an example embodiment. As discussed previously, the disclosed embodiments can implemented various methods and systems for forecasting well on sparse data streams by making use of other dense data streams which are typically available in practice (e.g., cities with high crimes, products with high purchase rates etc.). Method 120 (and similarly, the method 150 shown in FIG. 10) uses a novel combination of neural point process and metric learning approaches to first cluster the cities according to their 'forecasting capability'. A novel clustering based weight initialization module (e.g., a routine or sub-routine) can be utilized, which helps initialize the weights of a point process neural network for forecasting in sparse data streams.

As indicated at block 121, the process begins. As shown next at block 122, a step or operation can be implemented to define 'forecast features' using weights learned in a neural network. Thereafter, as shown at block 124, a step or operation can be processed for transforming the aforementioned forecast features using metric learning approaches to obtain features, which are close in the 'forecast' space. Next, as disclosed at block 126, a step or operation can be implemented in which the disclosed novel weight initialization scheme is applied for entities with sparse data streams that combine the weights from different clusters (which is very fast to implement). Then, as shown at block 128, explainable forecast predictions are provided for sparse data streams using clusters formed. The process then terminates, as shown at block 121.

Figure 10:
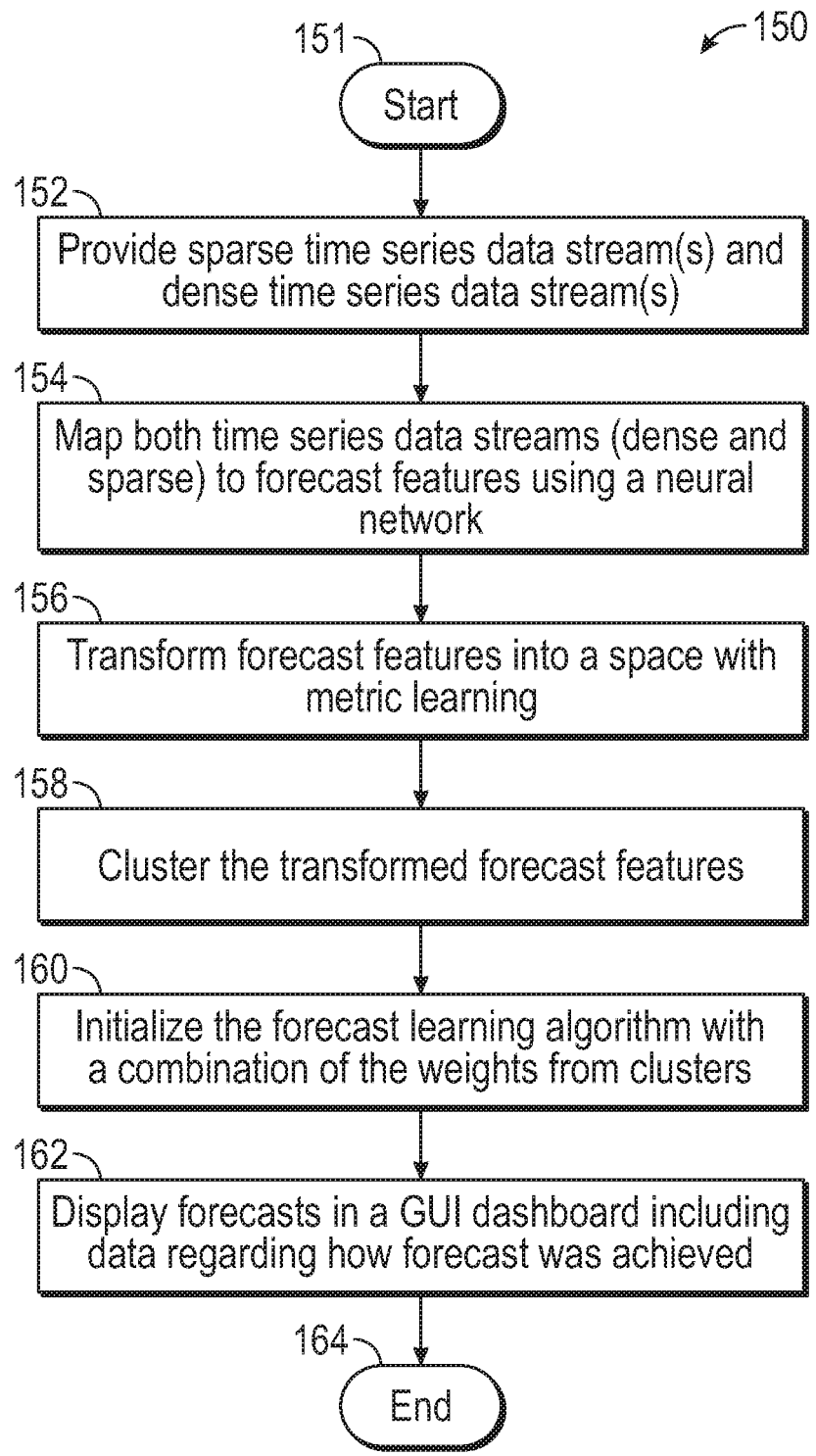
FIG. 10 illustrates a flow chart of operations illustrating logical operations, steps or instructions of a method for forecasting in sparse data streams via dense data streams, in accordance with an alternative example embodiment.

FIG. 10 illustrates a flow chart of operations illustrating logical operations, steps or instructions of a method 150 for forecasting in sparse data streams via dense data streams, in accordance with an alternative example embodiment. The disclosed method 150 is initiated, as shown at block 151. Next, as shown at block 152, a step or operation can be implemented in which a sparse time series data stream (or data streams) is provided along with a dense time series data streams(s). Thereafter, as shown at block 154, a step or operation can be implemented to map the aforementioned time series data stream(s) to forecast features using a neural network. Next, as depicted at block 156, a step or operation can be implemented to transform the forecast features space with metric learning. Then, as shown at block 158, a step or operation can be implemented to cluster the transformed forecast features. Thereafter, as depicted at block 160, a step or operation can be implemented to initialize the forecast learning algorithm with a combination of the weights from clusters. Then, as indicated at block 162, a step or operation can be implemented to display the forecasts in a GUI (Graphical User Interface) dashboard along with information about how the forecast was arrived at. The process can then terminate, as depicted at block 164.

As can be appreciated by one skilled in the art, example embodiments can be implemented in the context of a method, data processing system, or computer program product. Accordingly, some embodiments may take the form of an entirely hardware embodiment, an entirely software embodiment or an embodiment combining software and hardware aspects all generally referred to herein as a "circuit" or a "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, and so on.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a high speed printing system may be considered a special-purpose computer designed with the specific purpose of rendering or printing documents.

The aforementioned computer program instructions may also be stored in a computer-readable memory (e.g., such as the example memory 342 shown in FIG. 11) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
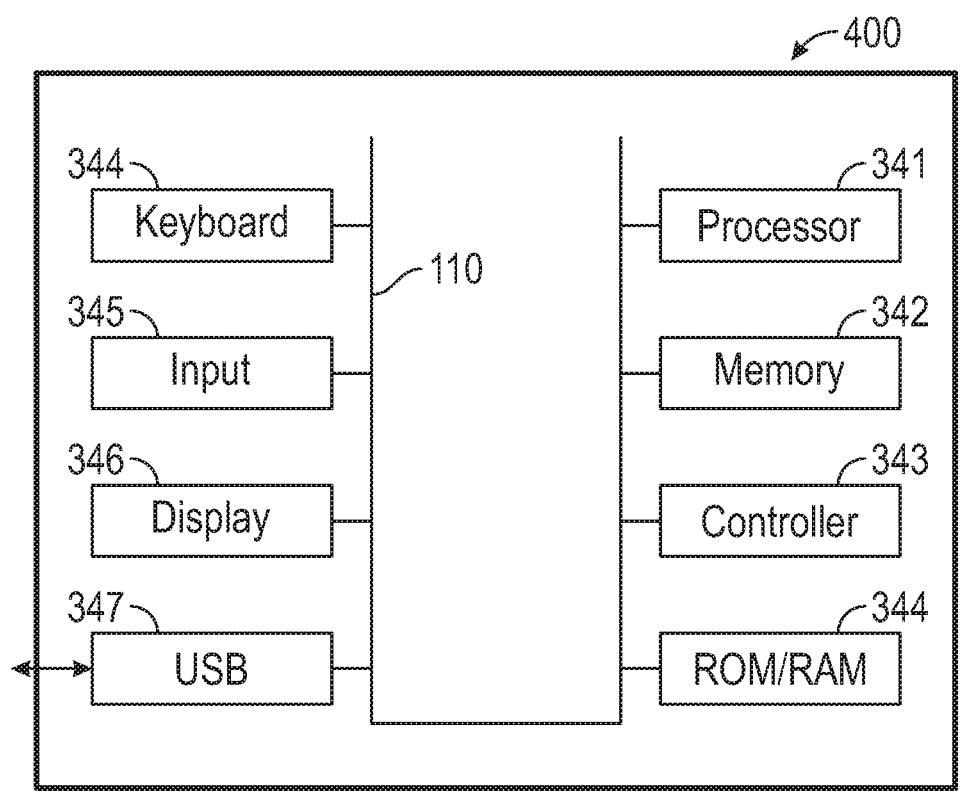
FIG. 11 illustrates a schematic view of a computer system, in accordance with an embodiment.
Figure 12:
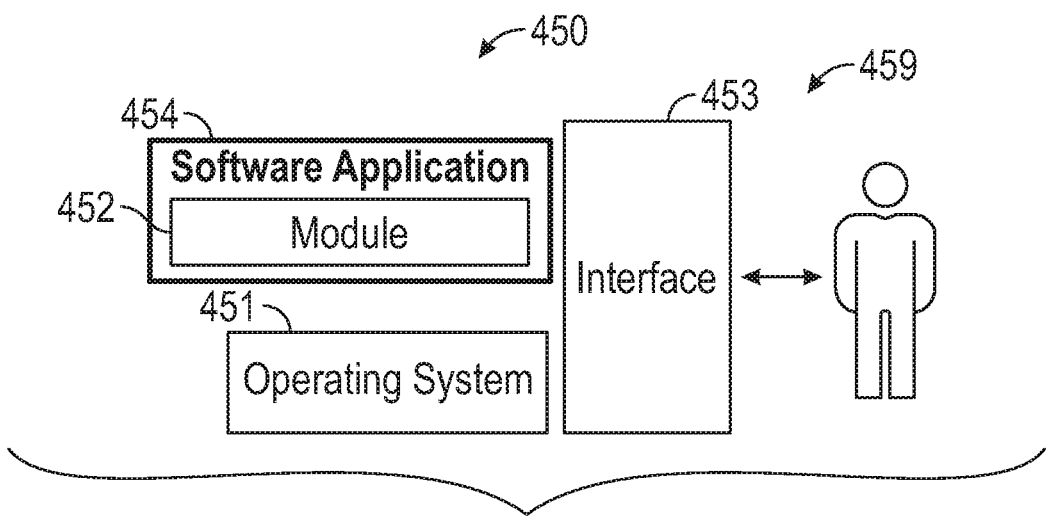
FIG. 12 illustrates a schematic view of a software system including a module, an operating system, and a user interface, in accordance with an embodiment.

FIGS. 11-12 are shown only as exemplary diagrams of data-processing environments in which example embodiments may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 11, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Such a CPU, alone or in conjunction with one or more of the other elements disclosed in FIG. 4, is an example of a production device, computing device or processor. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROME and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 12 illustrates a computer software system 450 for directing the operation of the data-processing system 400 depicted in FIG. 11. The software application 454, stored for example in memory 342 and/or another memory, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein (e.g., the instructions/operations of method 70 shown at blocks 72 to 86 in FIG. 7). Module 452 may also be composed of a group of modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In some example embodiments, the term "module" can also refer to a modular hardware component or a component that is a combination of hardware and software. Examples of modules include the various modules 16, 18, 20, 22, 24, 26 shown in FIG. 1. It should be appreciate that processing of the modules 16, 18, 20, 22, 24, 26 according to the approach described herein can lead to improvements in processing speed and ultimately in energy savings and efficiencies in a data-processing system such as, for example, the data-processing system 400 shown in FIG. 11.

FIGS. 11-12 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms and/or operating systems, including, for example, Macintosh/Apple (e.g., Mac OSx, iOS), UNIX, LINUX, Windows, Android, and so on.

Based on the foregoing, it can be appreciated that a number of example embodiments are disclosed herein. For example, in one embodiment a method for forecasting in sparse data streams via dense data streams can be implemented. Such a method can include steps or operations such as, for example, mapping a time series data stream to generate forecast features using a neural network; transforming the forecast features into a space with transformed forecast features thereof using metric learning; clustering the transformed forecast features in at least one cluster, initializing a forecast learning algorithm with a combination of the transformed forecast features in the at least one cluster corresponding to a sparse data stream, and thereafter generating forecast(s) via the forecast learning algorithm. Such forecast(s) can be then be displayed in a GUI dashboard with information indicative of how the forecasts were achieved. Note that the aforementioned mapping, transforming, clustering, initializing and/or generating steps/operations together (or individually) can lead to efficiencies (e.g., such as in speed, processing times, memory management, and so on) not only in forecasting but also in the underlying computing technology itself (e.g., computer processing speed, processing time, computer memory management, and so on). That is, improvements in forecasting efficiencies performed by a computer can result in improvements in efficiencies of the underlying computer technology used to make such forecasts. For example, an improved time involved in forecasting operations means faster processing time and power savings in the underlying computing technology such as the data-processing system discussed previously herein.

In some example embodiments, the term "sparse" in the context of the disclosed sparse data streams can be defined as the number of occurrences of an event of interest that is sparsely distributed over time. Additionally, in some example embodiments the clustering of the transformed forecast features in the cluster (or clusters) can be facilitated through the use of a clustering algorithm, such as, for example k-means ("K-Means") clustering or spectral algorithms. As discussed previously, examples of potential clustering algorithms that can be adapted for use with varying embodiments include, but are not limited to clustering algorithms such as, for example, K-Means, Mean-Shift Clustering, Spectral Clustering, Density-Based Spatial Clustering of Applications with Noise (DBSCAN), Expectation-Maximization (EM) Clustering using a Gaussian Mixture Model (GMM), and Agglomerative Hierarchical Clustering.

In some example embodiments, the aforementioned time series data stream can be mapped to fixed length vectors comprising the forecast features. In still other example embodiments, the aforementioned neural network can comprise a recurrent neural network. In yet another example, such as a recurrent neural network can be based on a (RMTPP) Recurrent Marked Temporal Point Process model.

In yet another example embodiment, a system for forecasting in sparse data streams via dense data streams can be implemented. Such a system can include, for example, at least one ("one or more") processor; a memory coupled to the at least one processor; and a set of computer program instructions stored in the memory and executed by the at least one processor in order to perform actions of, for example: mapping a time series data stream to generate forecast features using a neural network; transforming the forecast features into a space with transformed forecast features thereof using metric learning; clustering the transformed forecast features in at least one cluster; initializing a forecast learning algorithm with a combination of the transformed forecast features in the at least one cluster corresponding to a sparse data stream; and displaying forecasts in a GUI dashboard with information indicative of how the forecasts were achieved. As indicated previously steps or operations such as the mapping, transforming, clustering, and initializing steps or operations can lead to increases in the speed of the forecasting and computer processing of the system including the at least one processor, along with other improved efficiencies such as in memory management, power savings, and so on.

It is understood that the specific order or hierarchy of steps, operations, or instructions in the processes or methods disclosed is an illustration of exemplary approaches. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for displaying a graphical user interface (GUI) forecasting in sparse data streams via dense data streams, said method comprising:
    mapping a time series data stream to generate forecast features using a recurrent neural network comprising an input layer, a recurrent layer, and an output layer;
    transforming said forecast features into a space with transformed forecast features using metric learning facilitated by the recurrent neural network;
    clustering said transformed forecast features in at least one cluster, wherein the clustering involves weight based initialization to initialize weights of the recurrent neural network for forecasting in a sparse data stream;
    initializing a forecast learning algorithm with a combination of said transformed forecast features in said at least one cluster corresponding to the sparse data stream, wherein a relationship between the sparse data stream and a dense data stream is established by the clustering; and
    displaying forecasts in a GUI dashboard with information indicative of how said forecasts were achieved, wherein said mapping, said transforming, said clustering, and said initializing together lead to increases in a speed of said forecasting and computer processing of a computer displaying the GUI dashboard through a computer screen associated with a computer.

2. The method of claim 1 wherein sparse in said sparse data stream is defined as a number of occurrences of an event of interest that is sparsely distributed over time.

3. The method of claim 1 wherein:
    the forecast feature comprises a hidden unit representation that captures a crime pattern of a city;
    the metric learning includes a distance metric satisfying a non-negativity and a triangle inequality; and
    said clustering of said transformed forecast features in said at least one cluster is facilitated by a clustering algorithm.

4. The method of claim 3 wherein said clustering algorithm comprises a k-means clustering algorithm.

5. The method of claim 3 wherein said clustering algorithm comprises at least one of: a spectral clustering algorithm, a Mean-Shift Clustering algorithm, a Density-Based Spatial Clustering of Applications with Noise (DBSCAN) algorithm, an Expectation-Maximization (EM) Clustering algorithm using a Gaussian Mixture Model (GMM), and an Agglomerative Hierarchical Clustering algorithm.

6. The method of claim 1 wherein said time series data stream is mapped to fixed length vectors comprising said forecast features, the fixed length vectors including the distance metric.

7. The method of claim 1 wherein a hidden layer is contained with the recurrent layer and the input layer includes embedding blocks and timing and marker inputs.

8. The method of claim 7 wherein said recurrent neural network is based on a (RMTPP) Recurrent Marked Temporal Point Process model, wherein the embedding blocks include an embedded vector, where the embedded vector and temporal features are fed into the recurrent layer.

9. The method of claim 1 wherein said initializing said forecast learning algorithm, further comprises initializing said forecast learning algorithm with a combination of weights from said at least one cluster.

10. A system for displaying a graphical user interface (GUI) forecasting in sparse data streams via dense data streams, said system comprising:
    at least one processor;
    a memory coupled to said at least one processor;
    a set of computer program instructions stored in said memory and executed by said at least one processor in order to perform actions of:
        mapping a time series data stream to generate forecast features using a recurrent neural network comprising an input layer, a recurrent layer, and an output layer;
        transforming said forecast features into a space with transformed forecast features using metric learning facilitated by the recurrent neural network;
        clustering said transformed forecast features in at least one cluster, wherein the clustering involves weight based initialization to initialize weights of the recurrent neural network for forecasting in a sparse data stream;
        initializing a forecast learning algorithm with a combination of said transformed forecast features in said at least one cluster corresponding to the sparse data stream, wherein a relationship between the sparse data stream and a dense data stream is established by the clustering; and
        displaying forecasts in a GUI dashboard with information indicative of how said forecasts were achieved, wherein said mapping, said transforming, said clustering, and said initializing together lead to increases in a speed of said forecasting and computer processing of a computer displaying the GUI dashboard through a computer screen associated with a computer.

11. The system of claim 10 wherein sparse in said sparse data stream is defined as a number of occurrences of an event of interest that is sparsely distributed over time.

12. The system of claim 10 wherein:
    the forecast feature comprises a hidden unit representation that captures a crime pattern of a city;
    the metric learning includes a distance metric satisfying a non-negativity and a triangle inequality; and
    said clustering of said transformed forecast features in said at least one cluster is facilitated by a clustering algorithm.

13. The system of claim 12 wherein said clustering algorithm comprises a k-means clustering algorithm.

14. The system of claim 12 wherein said clustering algorithm comprises at least one of: a spectral clustering algorithm, a Mean-Shift Clustering algorithm, a Spectral Clustering algorithm, a Density-Based Spatial Clustering of Applications with Noise (DBSCAN) algorithm, an Expectation-Maximization (EM) Clustering algorithm using a Gaussian Mixture Model (GMM), and an Agglomerative Hierarchical Clustering algorithm.

15. The system of claim 10 wherein said time series data stream is mapped to fixed length vectors comprising said forecast features, the fixed length vectors including the distance metric.

16. The system of claim 10 wherein a hidden layer is contained with the recurrent layer and the input layer includes embedding blocks and timing and marker inputs.

17. The system of claim 16 wherein said recurrent neural network is based on a (RMTPP) Recurrent Marked Temporal Point Process model, wherein the embedding blocks include an embedded vector, where the embedded vector and temporal features are fed into the recurrent layer.

18. The system of claim 10 wherein said initializing said forecast learning algorithm, further comprises initializing said forecast learning algorithm with a combination of weights from said at least one cluster.

* * * * *